Dec. 3, 1968   HIROSHI SUZUKI   3,414,121
PACKING DEVICES FOR ELECTRIC FANS
Filed Dec. 26, 1967   6 Sheets-Sheet 6

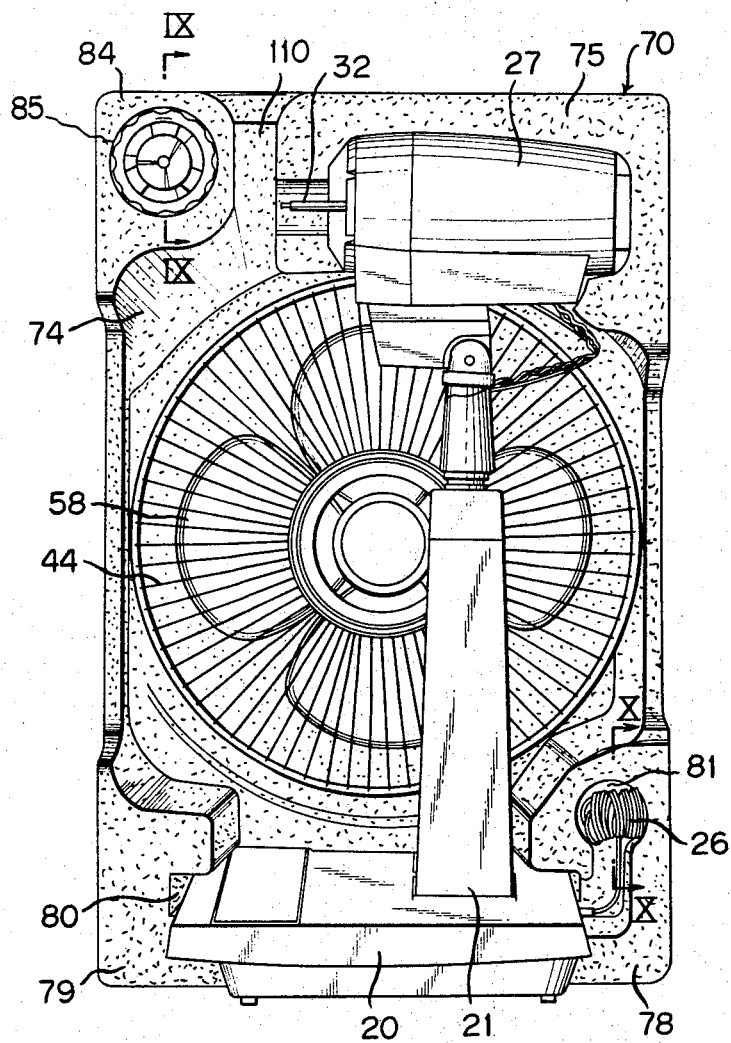

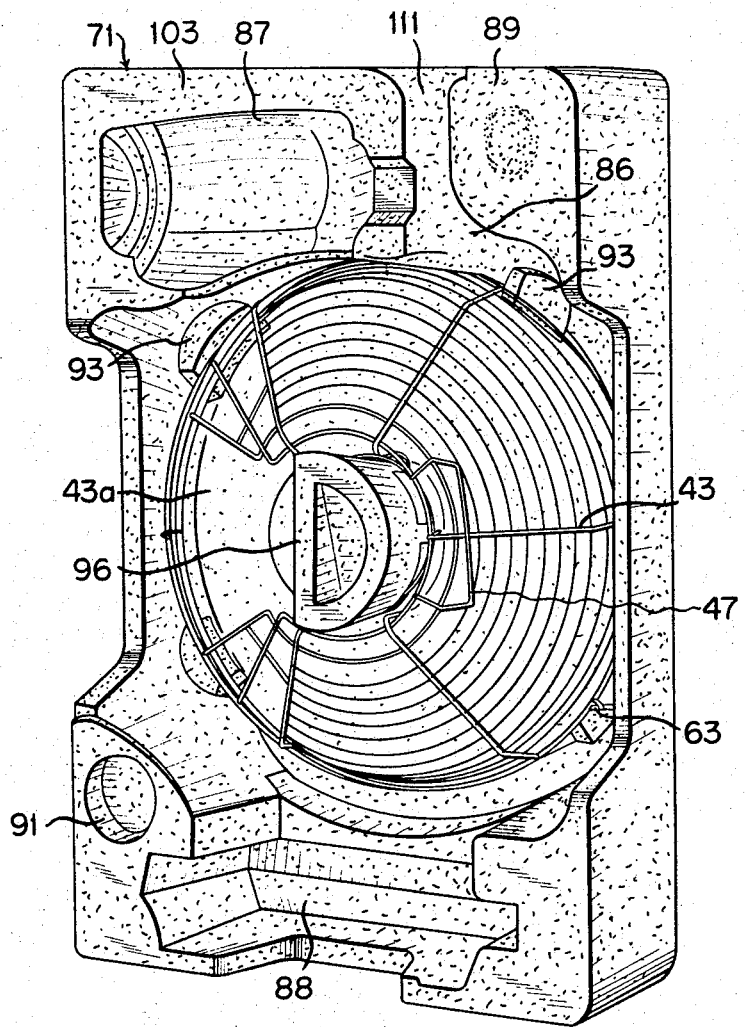

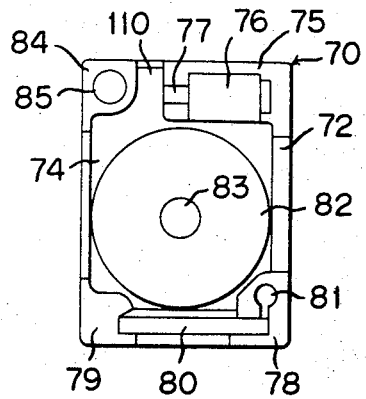
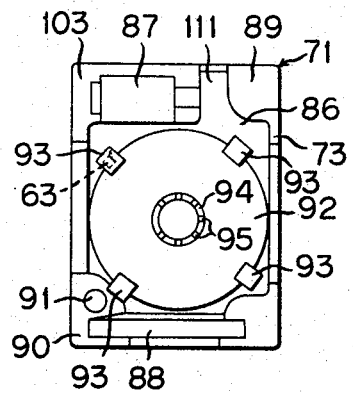
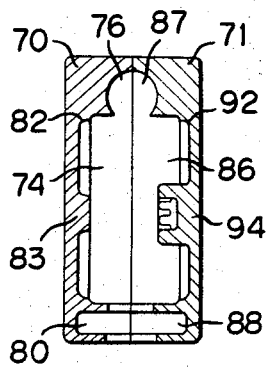
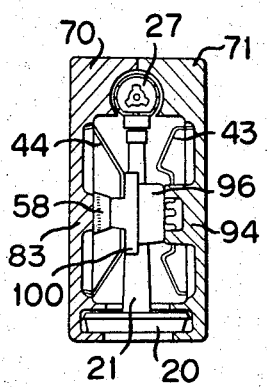
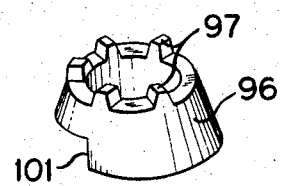
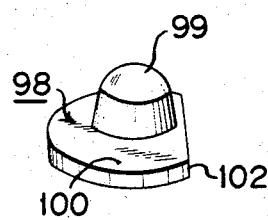

United States Patent Office 3,414,121
Patented Dec. 3, 1968

3,414,121
PACKING DEVICES FOR ELECTRIC FANS
Hiroshi Suzuki, Nagoya-shi, Japan, assignor to Tokyo Shibaura Denki Kabushiki Kaisha, Kanagawa-kau, Japan, a joint-stock company of Japan
Filed Dec. 26, 1967, Ser. No. 693,299
Claims priority, application Japan (all utility models): Dec. 29, 1966, 41/442, 41/443; Jan. 9. 1967, 42/2,107, 42/2,108, 42/2,109; Jan 13, 1967, 42/3,580, 42/3,581, 42/3,582; Feb. 28, 1967, 42/16,570, 42/16,571
8 Claims. (Cl. 206—46)

ABSTRACT OF THE DISCLOSURE

A packing box for packing component parts of an electric fan is comprised by a pair of complementary box halves each including a central recess and a second and third recesses on the opposite sides of the central recess whereby the sub-assembly including the motor, pedestal and base is accommodated in the central recesses and the second and third recesses, and fan guards are accommodated in the central recesses on opposite sides of the pedestal in back-to-back relation. The sub-assembly is positioned in the packing box on one side of the center of the central recesses to stabilize the package.

Background of the invention

This invention relates to a packing device of an electric fan and more particularly to a packing device or box which can accommodate various component parts of an electric fan in compact and stable state.

Generally, an electric fan comprises a base, an upright pedestal, an electric motor mounted on the upper end of the pedestal free to oscillate in the horizontal direction, a fan including a plurality of blades mounted on the motor shaft, and front and rear guards secured to the motor to enclose the fan blades. To transport or stow away such an electric fan, it has been the practice to house it in a packing box in the assembled condition with suitable spacers interposed between them. As the volume of the assembled electric fan is considerable, the size of the package is also large. Not only is this inconvenient to transport the package, but also a large storing space is required.

For this reason, such an electric fan is disassembled into a number of component parts for packing, For example, after disassembling the electric fan into various component parts, the fan blades are housed in the front and rear guards, and these component parts are put in a space defined by a sub-assembly including the base, motor, and pedestal in the packing box, the width thereof being determined by the longitudinal length of the base while the height of the box is determined by the sum of the heights of the pedestal and base plus the diameter of the motor. With this arrangement, the volume of the package becomes smaller than that of the case wherein the electric fan is packed in the assembled condition.

However, where the periphery of fan guards can not engage one side of the pedestal because of the fact that the diameter of the fan guard is smaller than the distance between the upper surface of the base and the lower surface of the motor, it is necessary to increase the width of the packing box by the distance between said one side of the pedestal and the periphery of the guards. As a result, in order to minimize this distance, it is required to design the base to have a special configuration, thus spoiling its appearance.

Thus, it will be noted that the volume of the package of an electric fan can be reduced to a minimum wherein the height of the package is determined by the height of the base, and the width is determined by the outer diameter of the guards.

Summary of the invention

It is therefore an object of this invention to provide a novel packing device which makes possible disassembling of an electric fan into sub-assemblies, each including predetermined component parts which can be housed in a packing box of minimum size which is easy to transport and occupies the minimum storing space.

Another object of this invention is to provide a novel packing device which can house sub-assemblies of an electric fan to uniformly distribute their weight for convenience in transportation.

The packing device of this invention for an electric fan including a fan, a pair of bowl shaped fan guards, a driving motor, a pedestal for supporting the motor, and a base comprises a packing box comprised by a pair of complementary box halves. Each of the box halves is provided with a central recess for accommodating one of the fan guards and the pedestal, and second and third recesses on opposite sides of the central recess to accommodate, respectively, the motor and the base, whereby a sub-assembly including the motor, pedestal, and base is accommodated in the central recess and in the second and third recesses, and the bowl shaped fan guards are accommodated in the central recesses on both sides of the pedestal in back-to-back relation. The fan is housed in one of the fan guards. The sub-assembly is housed on one side of the center of the recesses or at the bottom of the packing box, thus stabilizing the package.

Brief description of the drawings

FIGS. 3a and 3b are perspective views of two halves of a packing box to show the manner of housing various component parts therein;

FIGS. 4a and 4b show front elevations of two box halves;

FIG. 5 shows a longitudinal cross-section of assembled box halves;

FIG. 6 is a similar view of assembled box halves containing component parts of an electric fan;

FIG. 7 is an enlarged perspective view of a retaining member;

FIG. 8 is an enlarged perspective view of another retaining member;

Description of preferred embodiments

Figure 1:
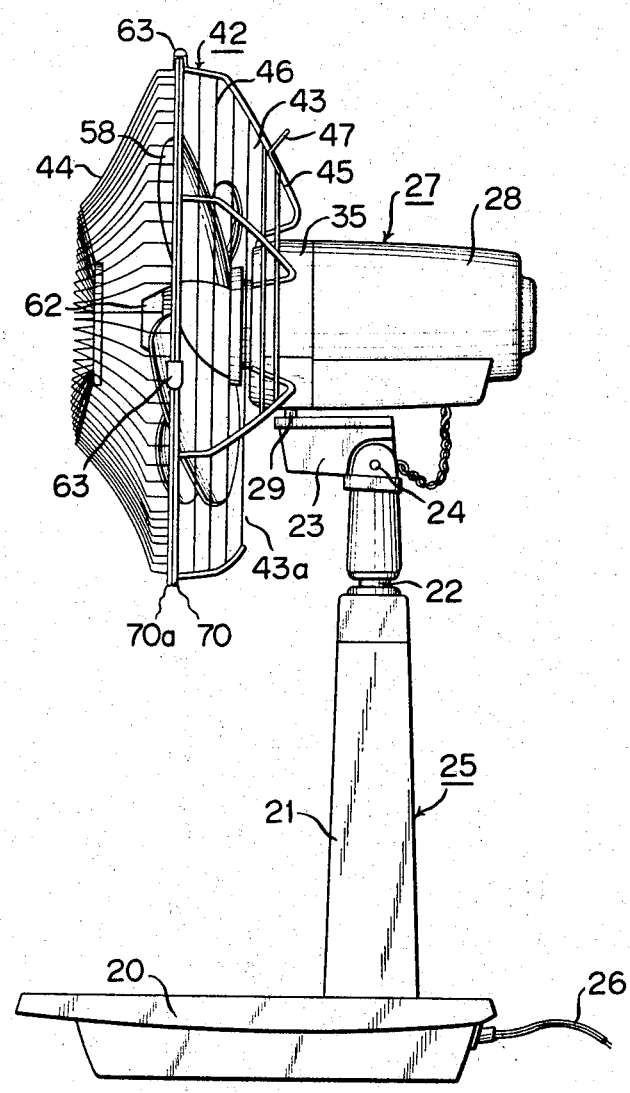
FIG. 1 shows a side elevation of a typical electric fan which can be housed in the housing device of this invention.
Figure 2:
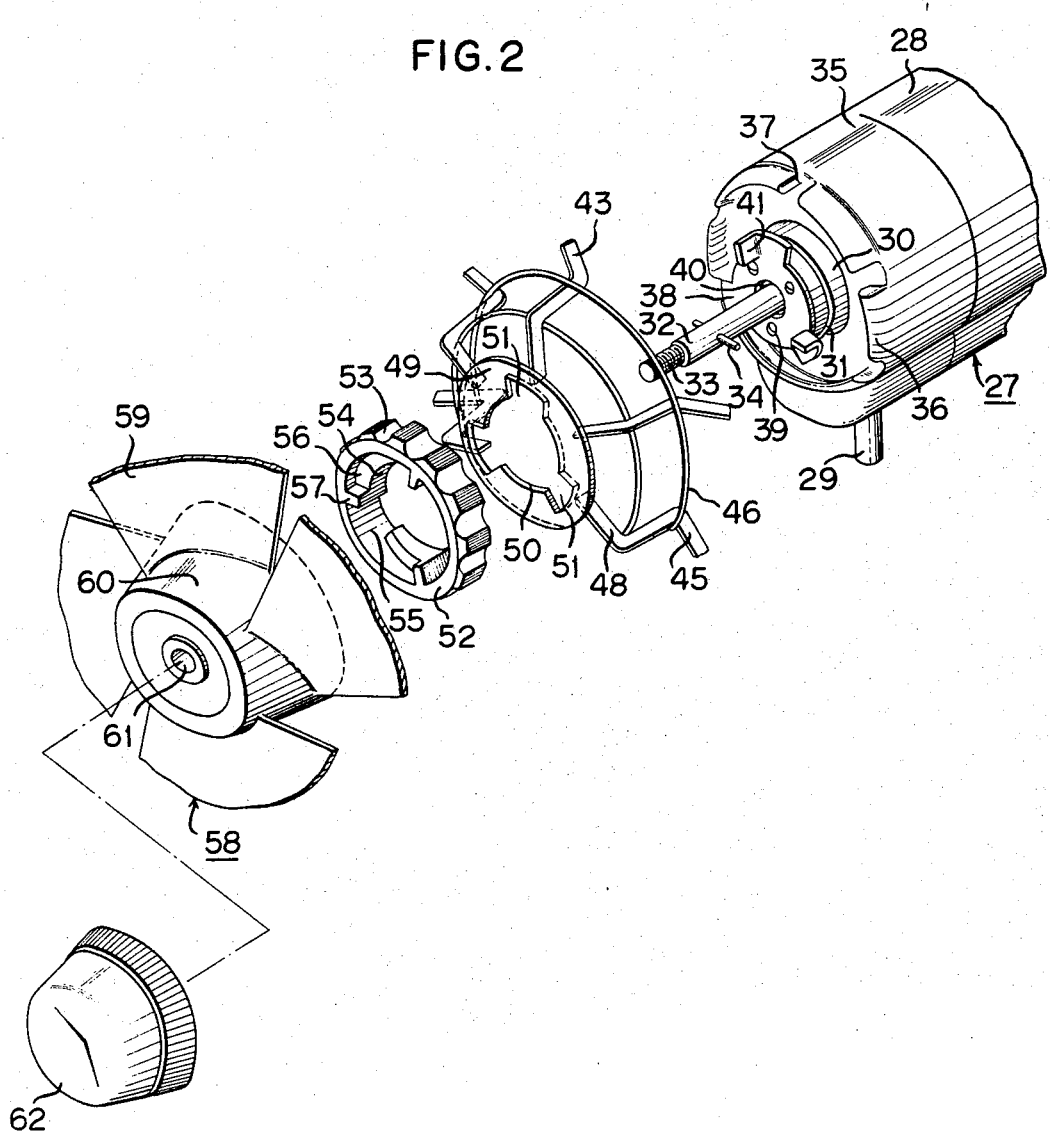
FIG. 2 is an enlarged and exploded perspective view of essential component parts of the electric fan shown in FIG. 1.

Referring now to the accompanying drawings, FIGS. 1 and 2 illustrate one example of an electric fan capable of being disassembled into component parts suitable for packing with the novel packing device. More particularly, a hollow upright pedestal 21 is secured to a horizontal base 20, and an adjustable pedestal 22 is received in hollow pedestal 21. At the upper end of adjustable pedestal 22, a neck piece 23 is so pivoted at 24 that it can tilt in the vertical direction about pivot 24.

As is well known in the art, the base is provided with a suitable speed control mechanism (not shown) which is connected to a supply cord 26. An electric motor 27 is supported by neck piece 23 through a stub shaft 29 to be rotatable in the horizontal direction. Base 20, pedestals 21 and 22, neck piece 23 and motor 27 comprise a sub-assembly 25 which is treated as a unitary structure during packing. The stator frame of motor 27 is ordinarily made of an aluminum or zinc die casting and formed with a cylindrical projection 30 at its fore end, the cylindrical projection having a stepped shoulder 31. Motor shaft 32 extending through cylindrical projection 30 has a threaded end 33 and a transverse pin 34. The stator frame is covered by a casing 35 made of molded plastic or a drawn sheet metal. Casing 35 is provided with an annular projection 36 having a plurality of radial slots 37 to receive arms of the rear guard in a manner to be described later. A clamping plate 38 is secured to the front end of cylindrical projection 30 by means of screws 39. The clamping plate has an opening 40 for the motor shaft at its center and a plurality of radial clamping tongues 41 on its periphery. The clamping plate may be formed integral with the cylindrical projection 30.

Fan guard 42 comprises a rear guard 43 removably mounted on the motor frame and a front guard 44 removably secured to rear guard 43. Rear guard 43 is generally of a bowl shape and comprises a plurality of circumferentially spaced radial arms 45 made of mild steel wires or angle bars, a handle 47, a plurality of circular guard wires 46, an annular ring 49 interconnecting the inner ends of radial arms 45, and a joint ring 70 interconnecting the outer ends of radial arms. Annular ring 49 is provided with a plurality of notches 51 corresponding to said clamping tongues 41 of clamping plate 38. At the rear lower portion of rear guard 43, guard wires 46 are removed to form a free space or notch 43a to clear neck piece 23 during oscillating movement of the electric fan.

There is provided a clamping ring 52 made of a plastic or a light metal, the outer periphery thereof being irregular as at 53. The inner guide surface 54 of clamping ring 52 is formed with a plurality of notches 55 corresponding to clamping tongues 41 and inclined cam surfaces 56 between notches 55, the axial height of the cam surface increasing in the counter-clockwise direction as viewed in FIG. 2. A stop 57 is provided at one end of each cam surface.

Fan 58 is made of metal or plastic, preferably the latter, and includes a plurality of blades 59 and a hub 60 having a shaft bore 61. On the rear edge of hub 60 are cut slots (not shown) adapted to receive pin 34 of motor shaft 32 to prevent relative movement of fan 58 and motor shaft 32 in their assembled state. Fan 58 is secured to motor shaft 32 by a spinner nut 62 engaging threaded end 33 thereof. Front guard 44 is removably secured to rear guard 43 by means of clips 63 pivoted or otherwise connected to annular joint ring 70. To assemble the fan and fan guards, the rear guard 43 is first mounted on cylindrical projection 30 with inner periphery 50 of annular ring 49 abutting against shoulder 31. Then arms 45 of rear guard 43 will be received in slots 37. Clamping ring 52 is urged against the front surface of annular ring 49 and is then rotated in the clockwise direction as viewed in FIG. 2, whereby clamping tongues 41 ride on inclined cam surfaces 56 to clamp annular ring 49 of front guard between clamping ring 52 and shoulder 31 on cylindrical projection 30.

Then hub 60, together with fan blades 59, is slipped over motor shaft 32 until the slots on its rear edge engage pin 34. Thereafter, spinner nut 62 is screwed onto threaded end 33 of the motor shaft to secure fan 59 thereto. Finally, front guard 44 is secured to rear guard 43 by joining joint rings 70 and 70a by means of clips 63 to protect the fan.

The electric fan can be disassembled by performing the above described steps in the reversed order. Thus, the electric fan can be disassembled into a sub-assembly 25 including electric motor 28, pedestals 21 and 22 and base 20; a fan blade assembly 58; and front and rear guards 44 and 43.

Referring now to FIGS. 4 and 5, the packing box embodying this invention includes two box halves 70 and 71 made of a foamed plastic, for example, styrene resin. One box half 70, shown in FIG. 4a, is provided with a central recess 74, a recess 76 for receiving the motor at its upper right corner, a recess 80 for receiving the base at its bottom, and a recess 81 for receiving cord 26. Bottom 82 of recess 74 is shaped to accommodate the annular joint ring 70a of front guard 44 and is provided with a projection 83 to receive hub 60 of the fan. Further, a frusto-conical recess 85 is formed at the left upper corner to receive spinner nut 62 and clamping ring 52 (see FIG. 9).

The other box half 71 is provided with similar recesses 86, 87 and 88 and 91 corresponding to recesses 74, 76, 80 and 81, respectively. However, the right upper corner 89 is made flat to merely cover recess 85. Bottom 92 of recess 86 is made circular to receive joint ring 70 of rear guard 43, and at the center of bottom 92 an annular projection 94 is formed to receive the rear end of the rear guard, said projection having slots 95 to receive radial arms 45. Further, box half 71 has a plurality of recesses 93 to receive clips 63. A frustoconical retaining member 96 (FIGS. 6 and 7) having projections 97 adapted to be received in said slots 95 is used to hold arms 45. A second retaining member 98 (FIGS. 6 and 8) includes a projection 99 adapted to engage the front surface of hub 60 of the fan when it is housed in the packing box as shown in FIG. 6 and a flange 100 adapted to engage the front surface of front guard 44. When packing the electric fan, these retaining members are positioned in back-to-back relation as shown in FIG. 6. These retaining members are notched as at 101 and 102 to clear pedestal 21. These retaining members may be combined into a unitary structure, if desired.

Figure 9:
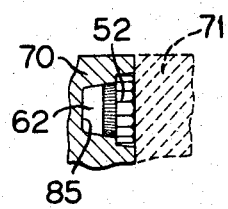
FIG. 9 shows a cross-sectional view taken along the line IX—IX in FIG. 3.
Figure 10:
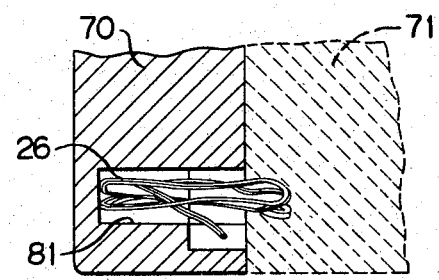
FIG. 10 shows a cross-sectional view taken along the line X—X in FIG. 10.

To house various component parts of the electric fan in recessed box halves 70 and 71, fan 58 is housed in recess 74 of box half 70 with the rear surface of its hub 60 abutted against projection 83. Then front guard 44 is placed over fan 58 with its annular ring 49a received in bottom 82. Sub-assembly 25 including motor 27, pedestals 21 and 22, and base 20 is partially placed in recess 76, 74 and 80 of the box half 70. Spinner nut 62 and clamping ring 52 are housed in recess 85 in overlapped relation as shown in FIG. 9, and cord 26 is housed in recess 81 as shown in FIG. 10. Rear guard 43 is housed in box half 71 as shown in FIG. 6 and is then retained in position by fitting projections 97 of retaining member 96 into slots 95 of annular projection 94. Another retaining member 98 is applied to front guard 44 with its flange 100 abutted against the front surface thereof.

Figure 11:
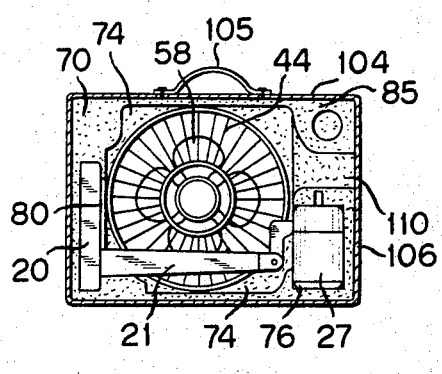
FIG. 11 is a cross-sectional view to illustrate the manner of containing the assembled packing box in an outer container.
Figure 13:
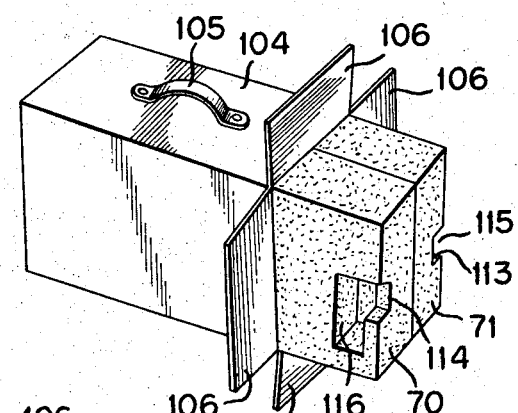
FIG. 13 is a perspective view wherein a modified packing box is partially drawn out of the outer container.
Figure 12:
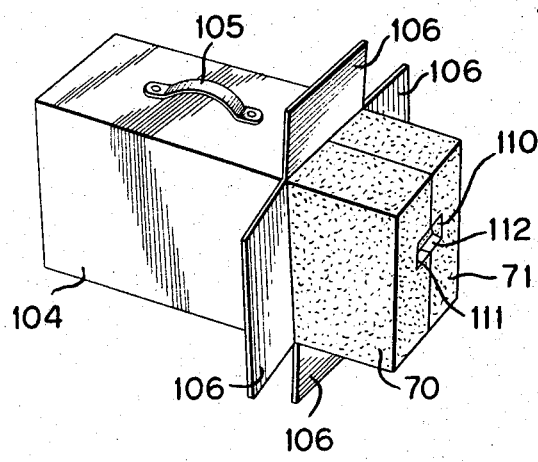
FIG. 12 is a perspective view wherein the packing box is partially drawn out of the outer container.

Thereafter, box halves 70 and 71 are combined as shown in FIG. 6 to completely enclose all component parts of the electric fan. Assembled packing box is then slipped into an outer container 104 made of corrugated cardboard, for example, as shown in FIG. 13. It is to be noted that the joint between box halves is vertical so that base 20, pedestal 21 and motor 27, which are heavier than the remaining parts, may be contained in the bottom portion of the packing box, as shown in FIG. 11 for convenience in transportation. Outer container 104 has a handle 105 on its upper surface and lid pieces 106. To make easy insertion and removal of the packing box into and out of the outer container, suitable recesses 115 and 116 (FIG. 13) or 110 and 111 (FIG. 12) may be provided for packing box halves 70 and 71.

Thus, this invention provides a novel packing device for an electric fan wherein the base, pedestal, and motor are housed at the center of the packing device, and bowl shaped front and rear guards are housed on opposite sides of said components in back-to-back relation whereby the width of the packing box can be reduced. In addition, as heavy component parts such as the base, pedestal, and motor are placed at the bottom of the packing box, the package is not only stable but also convenient to transport.

What I claim is:

1. A packing device for an electric fan including a fan, a pair of bowl shaped fan guards, a driving motor, a pedestal for supporting said motor, and a base, said packing device comprising a packing box comprised by a pair of complementary box halves, each of said box halves including a central recess for accommodating one of said fan guards and said pedestal, and second and third recesses on opposite sides of said central recess to accommodate said motor and said base, respectively, whereby a sub-assembly including said motor, pedestal, and base is accommodated in said central recess and in said second and third recesses, and said bowl shaped fan guards are accommodated in said central recesses of said box halves on both sides of said pedestal in back-to-back relation.

2. The packing device according to claim 1 wherein the rear guard has a notch to permit oscillatory movement of said electric fan and said guard is housed in said packing box in a manner such that said notch receives said pedestal.

3. The packing device according to claim 1 wherein said fan is contained in one of said guards.

4. The packing device according to claim 1 wherein the bottom of the central recess of each of said box halves is circular to receive the joint end of each of said fan guards.

5. The packing device according to claim 1 wherein said pedestal is contained on one side of the center of said central recesses.

6. The packing device according to claim 1 wherein a retaining member is interposed between said pair of guards positioned in back-to-back relation.

7. The packing device according to claim 1 wherein said retaining member is provided with a flange adapted to hold one of said guards and a projection to hold the fan contained therein.

8. The packing device according to claim 1 wherein said packing box containing said various components of said electric fan is housed in an outer container such that said sub-assembly including said base, pedestal, and motor is contained at the bottom of said outer container, and said outer container is provided with a handle on its upper surface.

References Cited
UNITED STATES PATENTS

| | | | |
|---|---|---|---|
| 1,667,887 | 5/1928 | Fallert | 206—46 |
| 3,363,953 | 1/1968 | Basch | 206—46 |

JAMES B. MARBERT, *Primary Examiner.*